United States Patent [19]

Teichert et al.

[11] 4,303,301

[45] Dec. 1, 1981

[54] CABLE COUPLING FOR ELECTRICAL CURRENT LINES AND LIGHT CONDUCTORS

[75] Inventors: Heinrich Teichert, Gondelsheim; Bruno Pfatteicher, Pfinztal, both of Fed. Rep. of Germany

[73] Assignee: Fabeg GmbH, Bretten, Fed. Rep. of Germany

[21] Appl. No.: 155,133

[22] Filed: May 30, 1980

[30] Foreign Application Priority Data

Jun. 1, 1979 [DE] Fed. Rep. of Germany ....... 2922937

[51] Int. Cl.³ ............................................... G02B 7/26
[52] U.S. Cl. .............................. 350/96.18; 350/96.22
[58] Field of Search ............... 350/96.15, 96.18, 96.20, 350/96.21, 96.22

[56] References Cited

U.S. PATENT DOCUMENTS

| | | | |
|---|---|---|---|
| 3,963,323 | 6/1976 | Arnold | 350/96.22 |
| 4,198,122 | 4/1980 | Prunier et al. | 350/96.21 |
| 4,265,511 | 5/1981 | Nicia et al. | 350/96.18 |

FOREIGN PATENT DOCUMENTS 52-49039 4/1977 Japan ................................ 350/96.20

OTHER PUBLICATIONS

Eckermann, "Möglichkeiten der Automatik . . . ", ZEV-Glasers Annalen, vol. 103, No. 2/3, Feb./Mar. 1979, pp. 114-124.

*Primary Examiner*—John D. Lee
*Attorney, Agent, or Firm*—Spencer & Kaye

[57] ABSTRACT

In a cable coupling for automatically coupling through conductors carrying electrical heating and/or control current lines between vehicles which are mechanically coupled together in a detachable manner, which coupling includes a contact box on each vehicle, each contact box containing a carrier carrying at least one electrical connector, with associated connectors in contact boxes on two vehicles coming into engagement with one another during or after mechanical coupling of the vehicles, the coupling further including optical fiber couplers for automatically coupling together optical fibers for the transmission of information, each optical fiber coupler is composed of a replaceable insert mounted in a respective carrier to be pivotable over a limited range in all directions relative to the carrier, and each insert includes: a member for holding the ends of a plurality of optical fibers in precise parallel alignment with one another and for holding, at the end of each such optical fiber, a lens element causing light emanating from the fiber to diverge; a glass pane disposed for passively protecting the associated lens elements; and a device for actively protecting the pane against moisture, fogging and dust.

18 Claims, 12 Drawing Figures

CABLE COUPLING FOR ELECTRICAL CURRENT LINES AND LIGHT CONDUCTORS

BACKGROUND OF THE INVENTION

The present invention relates to a cable coupling for automatically coupling through electrical heating and/or control current lines, particularly between trackbound vehicles, wherein during or after the mechanical coupling together of the vehicles, mutual contact between contact boxes containing pressure or plug-in contacts mounted in contact carriers causes these contacts to come into engagement and wherein, in addition to coupling the electrical lines, light-conductors must also be coupled in for the optical transmission of instructions or other information.

The periodical "ZEV, Glasers Annalen" [Glass Makers' Annual] 103 (1979) No. 2/3, February/March, pages 114–124, discloses the coupling of light conductive fibers together with electric current lines when automatically coupling electrical cables for trains. Control information is then transmitted from car to car by means of the light-conductive fibers. The light-conductive fibers are coupled together by means of a plug-in connection in which the highly polished fiber ends abut on one another in a precisely centered manner.

For so-called fixed optical conductor couplings there no longer exist any problems regarding coupling with low attenuation. The fibers can be brought together in the plug-in and rotary couplings with very close tolerances, high precision and accuracy. However, with automatic cable couplings there exists the difficulty of adapting the plug-in connection to rough movements of the train and to be able to accurately guide the cable ends with the required close tolerances over a longer period of time without thereby causing excess wear and thus impairing the transmission quality.

The active part of an optical fiber has a diameter, for example, of $200\mu$, and the threshold of the permissible center offset should be low. A very slight angular displacement is also permissible. These values can be achieved only with very close tolerances and with the use of fine centering means in the plug-in connections, which are far beyond the already high tolerance requirements for electrical couplings. Wear makes such plug-in connections very short-lived and manufacture becomes considerably more expensive.

Even more serious is the problem of soiling. A grain of dust can already completely eliminate light transmission because the grain is usually larger than the diameter of the fiber, or as the fiber ends are brought together such grain could scratch the highly polished frontal faces to such an extent that attenuation would take on untenable values. In the prior art cable coupling in which the ends of the light-conductive fibers are coupled directly, these problems are addressed as well. Centering is there effected by special guide pins and a mechanically susceptible slide structure is intended to take care of sealing and thus keep away the dust. But this gives rise to considerable drawbacks.

SUMMARY OF THE INVENTION

It is an object of the present invention to provide a reliable, automatic fiber optic coupling which can be used for automatic cable couplings, which is easy to maintain and replace and which solves the above-described problems with greater reliability.

This and other objects are achieved, according to the invention, in a cable coupling for automatically coupling through conductors carrying electrical heating and/or control current lines between vehicles which are mechanically coupled together in a detachable manner, which coupling includes a contact box on each vehicle, each contact box containing a carrier carrying at least one electrical connector, with associated connectors in contact boxes on two vehicles coming into engagement with one another during or after mechanical coupling of the vehicles, the coupling further including optical fiber couplers for automatically coupling together optical fibers for the transmission of information, by constituting each optical fiber coupler of a replaceable insert mounted in a respective carrier to be pivotable over a limited range in all directions relative to the carrier, which insert includes: a member for holding the ends of a plurality of optical fibers in precise parallel alignment with one another and for holding, at the end of each such optical fiber, a lens element causing light emanating from the fiber to diverge; a glass pane disposed for passively protecting the associated lens elements; and means for actively protecting the pane against moisture, fogging and dust.

The combined coupling of a plurality of light-conductive fibers at one time has the result that the dimensional imperfections have a reduced effect on angular errors. Stated in other terms, the angular displacement which, albeit small, is always present in an insert can be further reduced with increased installation base and the same manufacturing accuracy of the parts, or with reduced manufacturing accuracy it can at least be kept at the same level. Moreover, the use of lens plugs which, on the one hand, widen the light beam and, on the other hand, concentrate it again, makes it unnecessary to abut the fiber ends and eliminates the problems associated therewith. The distance between the coupling lens systems and a collimated, laser beam, which has been widened to a multiple of the fiber diameter, is not critical. Also, a displacement of the coupling insert can more easily be handled when the light beam diameter has been widened and grains of dust are unable to either completely cover the system or to produce scratches which would have any significant effect.

According to an advantageous embodiment of the invention, each insert is composed of a receiving drum for the lens plugs of light-conductive fibers and an extension tube which is axially fastened thereto. The end of the extension tube is provided with an outer circumferential, spherical annular bead with which the insert is movably mounted in a section of a guide tube permanently installed in the contact carrier against the force of a foam rubber ring disposed between the guide tube and the receiving drum. It is moreover very advisable to construct the receiving drum as a combination of a fully cylindrical member and a hollow cylindrical member obtained by turning, with the fully cylindrical member being provided with a central bore passing through the cylinder axis about which receiving bores for the lens plugs are grouped in a ring so that the plugs will be axially parallel to one another and will be disposed at equal distances and the hollow cylindrical member is designed to accommodate the means for protecting the lenses and for fine centering.

According to a particularly favorable embodiment, a glass pane serves as protection for the lens. This pane rests on the bottom face of the hollow cylindrical member of the receiving drum and is peripherally sealed against the inner wall and fastened via the flange of a ventilating nozzle screw which is brought through a central hole in the glass pane and into which is screwed the central bore of the fully cylindrical member of the receiving drum. It is further of great advantage if an aperture mask disc is placed onto the glass pane, forming a narrow gap, and this pane is fastened by means of the nozzle screw which passes through a central hole in the aperture mask disc, a nut being screwed onto this screw. The pane is always kept free of dust and fog by continuous blowing.

DESCRIPTION OF THE PREFERRED EMBODIMENTS

Figure 1:
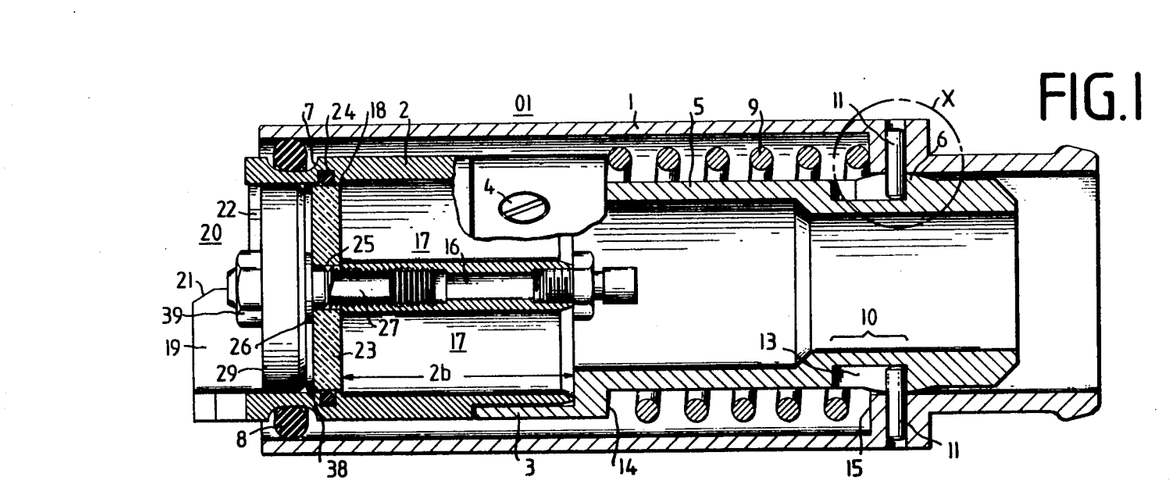
FIG. 1 is an axial, cross-sectional view of an embodiment of a light-conductor coupling according to the invention, completely mounted but without the light-conductive cable.

FIG. 1 is a cross-sectional view of a completely mounted light conductor coupling without the light-conductive fibers and lens plugs which will be attached thereto. A guide tube 1 can be pressed into an opening provided in a contact carrier 01 of the cable coupling, as shown more clearly in FIGS. 7 and 8, so as to accommodate the actual light-conductor coupling insert 2, 5. This coupling insert is composed of a frontal receiving drum 2 and a rear extension tube 5 which fits over a reduced diameter portion 3 of drum 2 and is fastened thereto by means of countersunk screws 4. The coupling insert 2, 5 is mounted in the guide tube 1 to be pivotal in all directions by means of annular bead 6 presenting a surface of spherical form and disposed at the rear end of the extension tube 5. A foam rubber ring 8 inserted in an outer groove 7 in the frontal portion of the receiving drum 2, which constitutes a hollow cylindrical portion 2a, then serves as a support against the guide tube 1 and assures that the axes of the various members coincide and the system is sealed. The coupling insert 2, 5 can be inserted from the front, i.e. from the left in FIG. 1, into the guide tube 1. A bayonet closure 10 under tension from a compression spring 9 provides the axial fastening.

Figure 2:
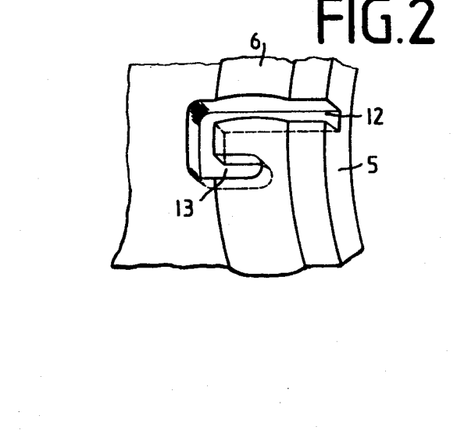
FIG. 2 is a detail perspective view of the portion of the structure of FIG. 1 enclosed by the circle X.

FIG. 2 shows the structure of the bayonet closure 10 in greater detail in a perspective view of the associated part of the rear extension tube 5. When the coupling insert 2, 5 is inserted in carrier 01, guide pins 11 housed in the guide tube 1 slide against the force of the compression spring 9 through axial guide grooves 12 in the extension tube 5 and, after a rotational movement about the axis of the insert, engage in detent grooves 13 and are forced by spring 9 against the bottom thereof under spring pressure. The guide grooves 12 extend from the end of the pipe, across and past the annular bead 6, and the detent grooves 13 then extend axially from the inner end of grooves 12 back to approximately the center of the annular bead 6. None of the grooves penetrates the wall material of the guide tube 1. The compression spring 9 is supported against an outward projection 14 of the extension tube 5 and against an inward projection 15 of the guide tube 1.

While the above parts can be manufactured with the usual accuracy and tolerances, only the receiving drum 2 intended to accommodate the lens plugs of the light conductors need be turned with great precision. As concerns configuration, this part has a similarity to the chambered cylinder of a revolver, as shown more clearly in FIGS. 3, 3a, 3b and 4.

This drum includes a basically solid cylindrical rear portion 2b and a hollow cylindrical front portion 2a. The solid cylindrical portion 2b is provided with a central bore 16 surrounded by a plurality of receiving bores 17 of a somewhat larger diameter than bore 16 for the lens plugs. Bores 17 are arranged with their centers on a circle concentric with the axis of bore 16.

Since the tolerance permitted for the angular positions of the light fibers must not exceed a magnitude of the order of minutes, the axes of these bores 17 must be exactly parallel to one another and to the central bore 16 and very precisely at right angles to the bottom surface 18 of the hollow cylindrical portion 2a. The front portion of the receiving drum 2, defined by the hollow cylindrical portion 2a, is bored out toward the bottom face 18 so that only a narrow wall edge remains. This wall edge serves for fine centering and for that purpose is provided with two cut-away areas 20, thus forming annular claws 19. These annular claws 19 each subtend a 90° arc, each area 20 also subtending a 90° arc and being located between annular claws.

The annular claws 19 and areas 20 are symmetrically arranged with respect to the horizontal and vertical center planes. Two receiving drums 2 of two corresponding coupling halves can thus interengage in a finely centering manner. For better guidance, the edges 21 of the annular claws 19 are sloped toward the areas 20. Slits or holes 22 with axial and radial orientation serve to press out foreign bodies during the coupling process and as air escape holes in the coupled state.

Figure 3:
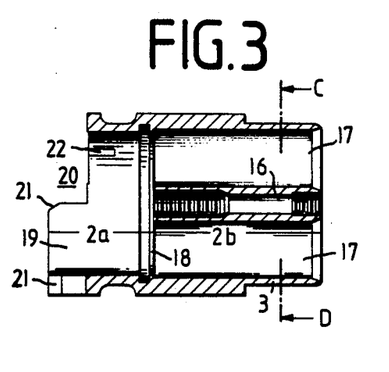
FIG. 3 is a longitudinal cross-sectional view of one element of the coupling of FIG. 1, which element is a receiving drum.
Figure 3A:
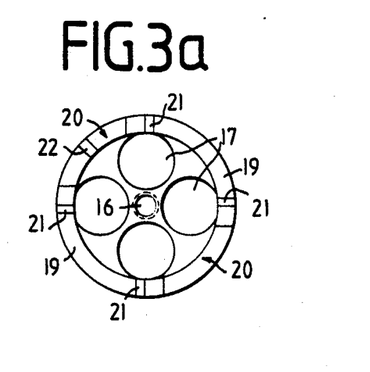
FIG. 3a is an axial end view of the receiving drum of FIG. 3.

Within the hollow cylindrical portion 2a, i.e. closely in front of the lenses (not shown here) of the four lens plugs which will be housed in the receiving bores 17, a refraction-free optical glass pane 23 of special glass contacts the bottom surface 18 to provide defined wave transmission. This glass pane is intended to protect the lenses against dust and condensate formation and for that reason the remaining air space between those lenses and glass pane 23 is kept so small that the absolute water content is insufficient for significant dew formation. Additionally, installation can be effected in low humidity rooms. Moreover, it is possible to evacuate air from that air space.

The glass pane 23 is inserted to be absolutely tight, for which purpose it is surrounded peripherally by a gasket 24 which rests in an internal groove of the bored out portion 2a. The peripheral seal 24 can simultaneously compensate for different coefficients of expansion of glass and metal. The glass pane 23 is provided with a central hole 25 and, as shown in detail in FIG. 6, is fastened via fastening flange 26 of a hollow nozzle screw 27 which is screwed via a thread 28 into the central bore 16 of the receiving drum 2.

Figure 5:
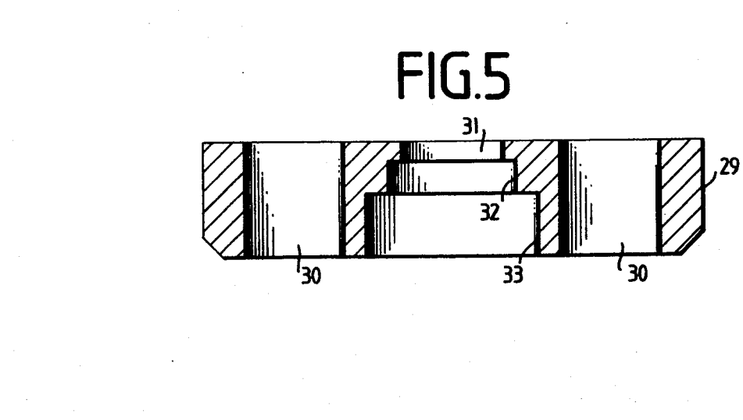
FIG. 5 is a cross-sectional view of a component of the coupling of FIG. 1, which component is an aperture mask disc.

Within the portion 2a, in front of the glass pane 23, there is additionally provided an aperture mask disc 29, which is shown by itself in FIG. 5. Disc 29 is provided with four axial bores 30 which are grouped with their centers on a circle about a center axis at uniform intervals and which must be optically flush with the receiving bores 17 in the receiving drum 2. The aperture mask disc 29 is provided with a central hole 31 passing through the center axis and widening in diameter in two stages 32 and 33 in the direction toward the glass pane 23. As best seen in FIG. 6, the last diameter stage 33 extends axially somewhat beyond the edge of fastening flange 26 while leaving a narrow gap 34 therewith.

Starting at the fastening flange 26 and extending in the direction toward the coupling side, i.e. away from the glass pane 23, the diameter of the nozzle screw 27 also decreases in two stages 35 and 36. Between the stage 32 of the aperture mask disc 29 and stage 36 of the nozzle screw 27 there is disposed a sealing O-ring 37, while, as shown in FIG. 1, an O-ring 38 is disposed between the aperture mask disc 29 and the glass pane 23, in the region of the outer diameter thereof. The aperture mask disc 29 is held by a nut 39 screwed onto threads at the front end of nozzle screw 27.

Figure 6:
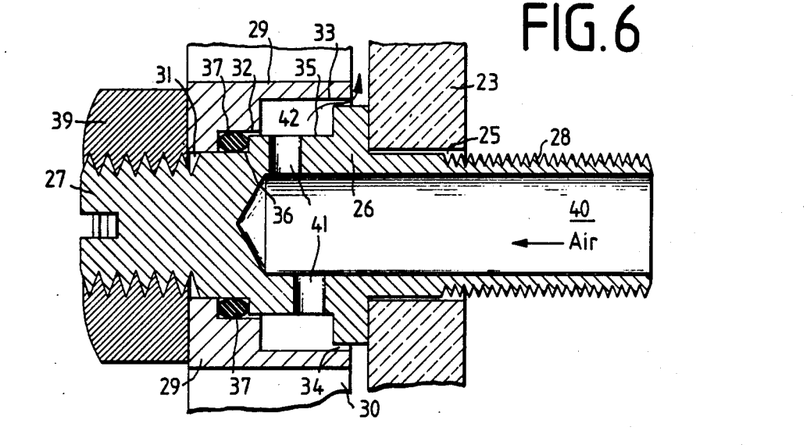
FIG. 6 is a cross-detail view of a portion of the embodiment of FIG. 1, to an enlarged scale, illustrating details regarding ventilation.

Reverting to FIG. 6, in the direction toward the vehicle carrying carrier 01, the nozzle screw 27 is provided with a central bore 40 through which air is blown. After passage through radial nozzle holes 41, communicating with bore 40, the air enters into an annular chamber formed between diameter stages 33 and 35 and flows from there in the direction of the arrow through the narrow gap 34 and across the surface of glass pane 23. From there it passes through the bores 30 in the aperture mask disc 29 and then into the open.

The flow speed of the air is selected to normally prevent any accumulation of dust and humidity on the outside of the glass pane 23. The inside of the glass pane 23 as well as the lenses of the lens plugs are hermetically encapsulated as already described. For extreme cases, hot air may be blown in, if required. If during operation it should become necessary to clean the accessible side of glass pane 23, it is only necessary to remove nut 39 and the aperture mask 29 to expose the pane.

Figure 3B:
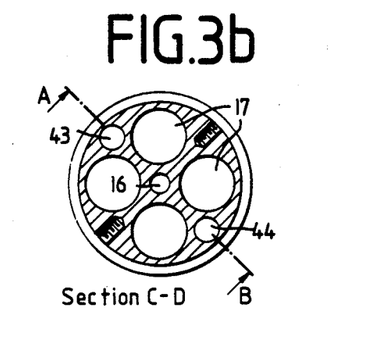
FIG. 3b is a cross-sectional view along the section line C-D of FIG. 3.
Figure 4:
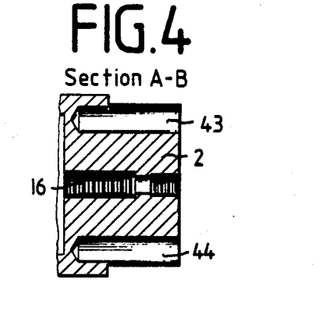
FIG. 4 is a cross-sectional view of the receiving drum along the line A-B of FIG. 3b.

Under particularly extreme conditions, e.g. in winter, it may become necessary to heat the receiving drum 2 so as to prevent internal fogging and icing of the actually sealed lens/pane section. For this purpose, the receiving drum of the illustrated embodiment is provided, as shown in FIGS. 3b and 4, with two blind bores 43, 44 into which heating elements can be introduced. Moreover, if necessary, it is possible, as a supplementary measure, to cause the glass pane to undergo low-frequency vibrations in order to prevent external deposits of dust. In that case a small electromagnetic vibratory system (not shown) would have to be attached at the rear portion of the receiving drum 2. A further possibility is the electrostatic prevention of dust. For this purpose, the aperture mask disc and the passage for the presently employed nozzle screw, for example, would have to be modified so that a high voltage potential would be present between the edge of the aperture mask disc and the nozzle screw, thus forming an electrofilter.

Figure 7:
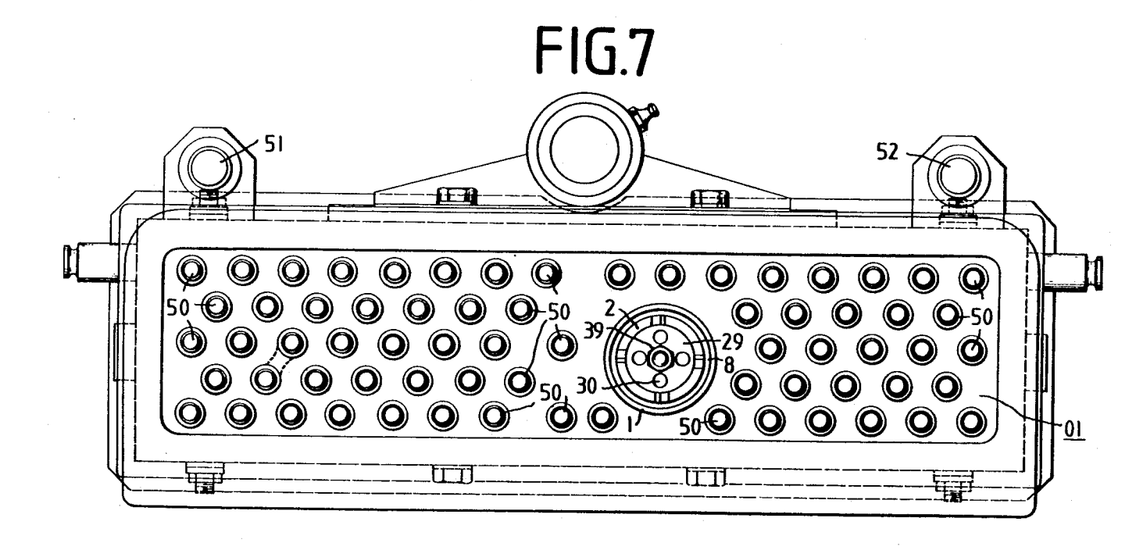
FIG. 7 is a frontal elevational view of a cable coupling with contacts and installed light-conductor coupling according to the invention, with protective plate removed.
Figure 8:
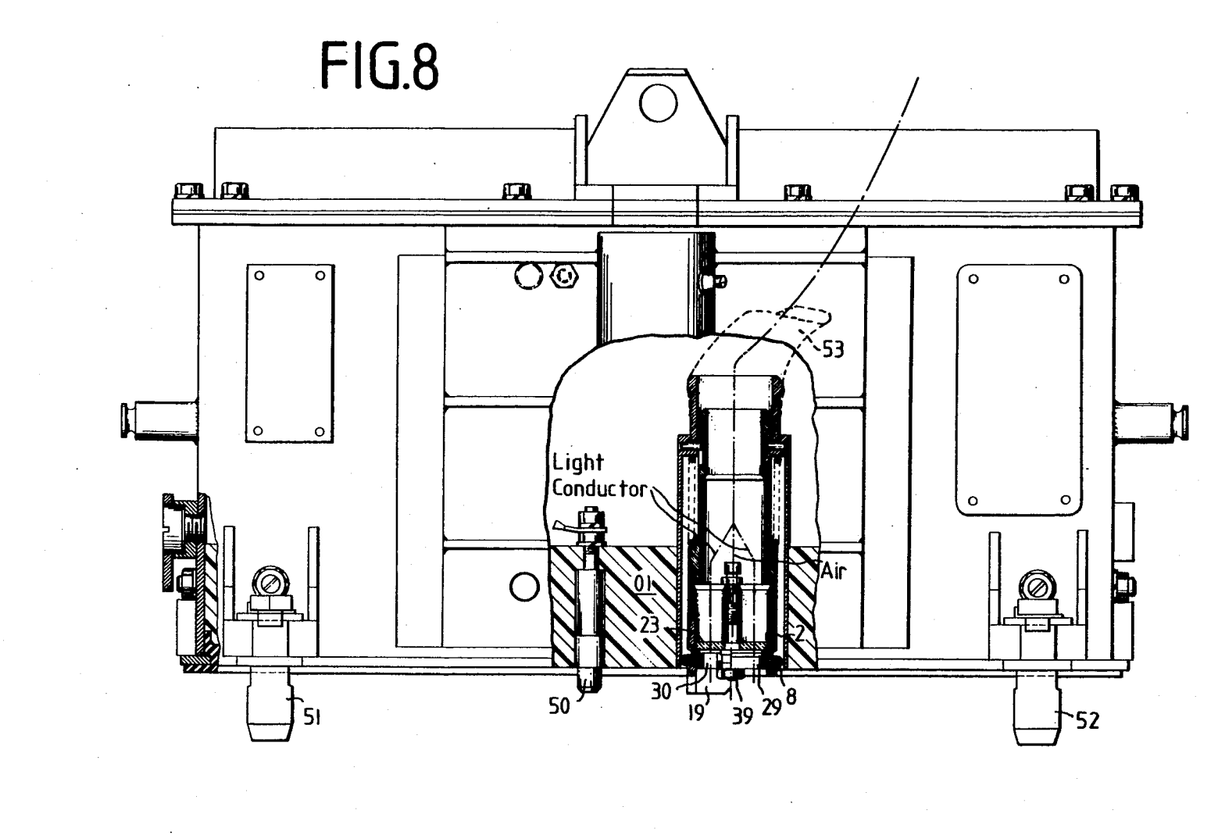
FIG. 8 is a top plan view, partly in cross section, of the cable coupling of FIG. 7.

FIGS. 7 and 8 additionally show a complete cable coupling half, FIG. 7 being a frontal elevational view and FIG. 8 a plan view, with a protective flap removed to facilitate illustration constituting one of the possible arrangements of the fiber optic coupling of FIG. 1 within a cable coupling. The cable coupling includes a large number of electrical pressure contacts 50 of which only one is shown in detail in FIG. 8. The coupling further includes guide bolts 51 and 52 for connecting to a mating coupling. As can be seen in FIG. 8, only, the annular claws 19, which during coupling engage into corresponding recesses of the corresponding coupling half in the finely centered manner described above, protrude from the fiber optic coupling. During a coupling operation, the inserts 2, 5 can move back somewhat against the force of the associated compression springs 9. The fiber optic cable as well as the supply of compressed air to the fiber optic coupling are installed and protected in a hose 53 approximately as shown by the dot-dash line and broken lines. The fiber optic cables are individually connected with the vehicle by means of conventional fixed couplings.

If lens damage or clouding should at some time produce an error which cannot be remedied by cleaning the glass pane 23, the entire insert 2, 5 can simply be removed and replaced via the bayonet lock 10. The glass pane 23 may have a diameter of 30 mm, with a thickness of 4 mm. It should consist of a refraction-free special quartz-glass with low damping effects, such as offered under the Trademark Spektrosil B.

Figure 9:
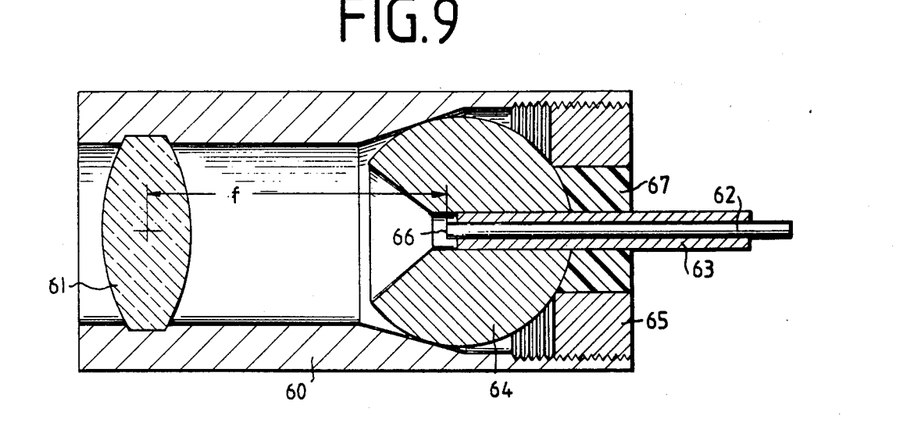
FIG. 9 is an axial cross-sectional view of a lens-plug for insertion into the receiving drum shown in FIG. 3 and FIG. 1.

FIG. 9 shows in a detail view one of the four used lens-plugs. Each of it consists of a guide tube 60 with an internal lens 61 and a coupled light-conductive fiber 62. The fiber 62 is surrounded with a protecting sheath 63 and located within a movable ball 64 to align the optical axis of fiber 62 and lens 61. The ball 64 is fixed by a nut 65. On the other hand the end-surface of the optical fiber exactly is brought in a short focusing distance f ($f \approx 10$ mm) to the lens and will be fixed there by a sealing mass 67.

The lens 61 of the plug has achromatic effects, is made of a special glass and is provided with an antireflecting coating.

Figure 10:
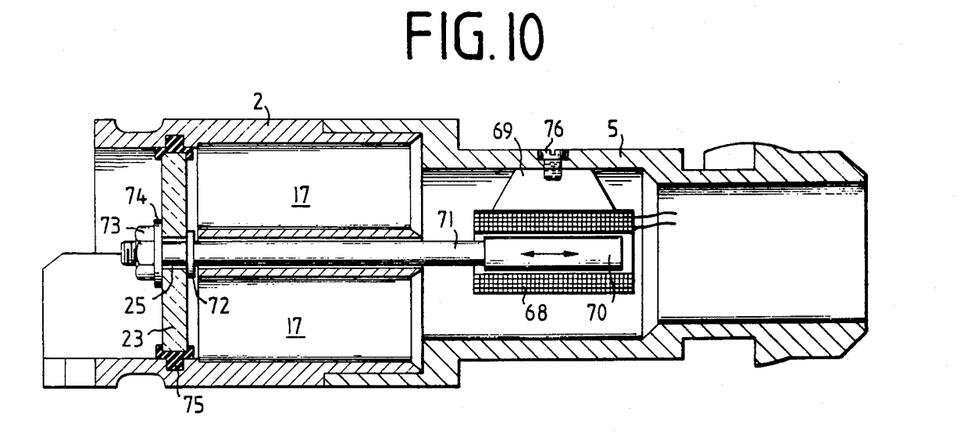
FIG. 10 is an axial cross-sectional view of a modified embodiment of the insert shown in FIG. 1, the insert now has a electromagnetic vibratory component.

FIG. 10 presents in another modification the possibility to repel dust from the glass pane 23 by vibrations of a vibrator 68. This may be necessary if there is no compressed air, but blowing the glass pane 23 with air seems to be the best solution. In FIG. 10 the coil of the vibrator 68 may be fed with a.c. and frequencies about 60 cps or less. The vibrator 68 is located within the extension tube 5 by 3 external stiff ribs 69 and fastened to the inside of the tube by penetrating screws 76. 70 is the magnetic anchor of the vibrator 68 which is coupled with a rod 71 extending through the central bore 25 in the glass pane 23. Inside the glass pane 23 is fastened to the rod 71 by a flange 72 and outside by a nut 73 with washer 74. For sealed vibrations the glass plane 23 is elastically supported by a special framing gasket 75. In this case there is'nt need for any aperture mask disc and air pressure. But mixed solutions are possible too.

It will be understood that the above description of the present invention is susceptible to various modifications, changes and adaptations, and the same are intended to be comprehended within the meaning and range of equivalents of the appended claims.

What is claimed is:

1. In a cable coupling for automatically coupling through conductors carrying electrical heating and/or control current lines between vehicles which are mechanically coupled together in a detachable manner, which coupling includes a contact box on each vehicle, each contact box containing a carrier carrying at least one electrical connector, with associated connectors in contact boxes on two vehicles coming into engagement with one another during or after mechanical coupling of the vehicles, the coupling further including optical fiber couplers for automatically coupling together optical fibers for the transmission of information, the improvement wherein each optical fiber coupler comprises a replaceable insert mounted in a respective carrier to be pivotable over a limited range in all directions relative to said carrier, and each said insert includes: a member for holding the ends of a plurality of optical fibers in precise parallel alignment with one another and for holding, at the end of each such optical fiber, a lens element causing light emanating from the fiber to diverge; a glass pane disposed for passively protecting the associated lens elements; and means for actively protecting said pane against moisture, fogging and dust.

2. Coupling as defined in claim 1 wherein said insert comprises: a receiving drum constituting said member; and an extension tube axially fastened to said insert and provided in the vicinity of its free end with an external bead having a spherical surface and extending around the periphery of said tube, and each said carrier comprises: a guide tube for each said insert in which its associated insert is movably mounted; and a foam rubber ring disposed between each said guide tube and said receiving drum of its associated insert for centering that said insert in its associated guide tube.

3. Coupling as defined in claim 2 further comprising means defining a bayonet lock between said extension tube and said guide tube for holding said insert in position in said guide tube, said means including bayonet grooves located at opposite sides of one said tube, each groove including an axial extending guide groove portion and an axial extending detent groove portion shorter than said guide groove portion and having a closed free end, locking pins carried by the other said tube for engagement in said bayonet grooves, and compression spring means for urging said pins toward the closed free ends of said detent groove portions.

4. Coupling as defined in claim 3 wherein said bayonet grooves are disposed in said extension tube such that said guide groove portions extend from said free end of said extension tube and across said bead to a point past said bead, and the free ends of said detent groove portions are located at approximately the center of said bead.

5. Coupling as defined in claim 4 wherein said extension tube presents a radially outwardly extending surface and said guide tube presents a radially inwardly extending surface, and said compression spring means encloses said extension tube and is supported against said radially extending surfaces.

6. Coupling as defined in claim 2 wherein said receiving drum comprises a first cylindrical portion and a hollow cylindrical portion, said first cylindrical portion being essentially solid and being provided with a central bore coaxial with the longitudinal axis of said drum and a plurality of axially parallel receiving bores uniformly spaced in a ring around said central bore for receiving lens elements, and said hollow cylindrical portion has a thin wall and is designed to receive said means for actively protecting said pane.

7. Coupling as defined in claim 6 wherein: two said inserts are each mounted on a respective carrier to be coupled together when the associated connectors in contact boxes on two vehicles come into engagement; said hollow cylindrical portion of each of said two inserts is located at the end thereof via which coupling with the other said insert is effectuated; and that end of said hollow cylindrical portion of each said insert which is located at said end of said insert is formed to present axially projecting arcuate claws subtending an arc of 90° about the axis of said hollow cylindrical portion and spaced apart by recesses each subtending an arc of 90° about the axis of said hollow cylindrical portion, said hollow cylindrical portions of said two inserts engaging one another during coupling of said inserts in a manner such that said claws of each said insert enter said recesses in the other said insert to establish fine centering of said inserts relative to one another.

8. Coupling as defined in claim 7 wherein the free ends of said claws are provided with sloping lateral surfaces so as to facilitate gripping and centering between said claws of said two inserts.

9. Coupling as defined in claim 6 wherein: said drum presents a surface transverse to its axis and delimiting the interior end of said hollow cylindrical portion; said glass pane bears against said transverse surface and is provided with a central bore aligned with said central bore of said first cylindrical portion; said insert further comprises means forming a seal between the periphery of said glass pane and said wall of said hollow cylindrical portion; and said means for actively protecting comprises a nozzle screw having an axial bore and extending through said central bore in said glass pane and into said central bore of said first cylindrical portion, said nozzle screw being fastened to said first cylindrical portion, being arranged to direct air from its said axial bore against said pane, and presenting a radially outwardly projecting flange holding said pane against said transverse surface.

10. Coupling as defined in claim 9 wherein said insert further comprises an aperture mask disc provided with a central bore and said nozzle screw comprises fastening means extending through said central bore in said aperture mask disc for holding said aperture mask disc adjacent said glass pane while forming a narrow gap with the wall of said central bore in said aperture mask disc.

11. Coupling as defined in claim 10 wherein said aperture mask disc and said nozzle screw are designed, and held insulated from one another, to form the poles of an electrostatic air filter.

12. Coupling as defined in claim 10 wherein: said central bore in said aperture mask disc has a stepped configuration such that the diameter thereof increases progressively in two steps in the direction toward said glass pane; said fastening means of said nozzle screw is in the form of a cylinder extending from the side of said flange remote from said glass pane and defined by a first part adjacent said flange and having a diameter smaller than that of said flange and a second part adjacent said first part, spaced from said flange and having a diameter less than that of said first part; and said aperture mask disc is positioned on said fastening means in such a manner that the larger diameter step of said aperture mask disc is at least in part axially coextensive with said flange and defines said narrow gap therewith and is at least in part axially coextensive with said first part of said cylinder and defines therewith an annular chamber communicating with said narrow gap, and the smaller diameter step of said aperture mask disc is at least in part axially coextensive with said second part of said cylinder and defines therewith a space for receiving a sealing ring.

13. Coupling as defined in claim 12 wherein said aperture mask disc nozzle screw is provided with a central, axially extending bore for the delivery of air, and with a plurality of radially extending passages communicating between said bore in said nozzle screw and said annular chamber for supplying said annular chamber with air, whereby a path is provided for the flow of a stream of air from said bore in said nozzle screw through said narrow gap, radially along the surface of said glass pane and then axially through the holes of said aperture mask disc and out of said insert.

14. Coupling as defined in claim 9 further comprising electromagnetic vibratory means arranged to act through said central bore in said nozzle screw for vibrating said glass to repel dust.

15. Coupling as defined in claim 6 wherein said first fully cylindrical portion of said receiving drum is further provided with at least one blind bore for the accommodation of a heating device.

16. Coupling as defined in claim 1 further comprising means for vibrating said glass pane to repel dust.

17. Coupling as defined in claim 16 wherein said means for vibrating are electromagnetic means.

18. Coupling as defined in claim 1 further comprising electrostatic means for removing dust from the region of said glass pane.

* * * * *